United States Patent
Lennartson et al.

(10) Patent No.: US 8,649,284 B2
(45) Date of Patent: Feb. 11, 2014

(54) CELLULAR CONGESTION AND ADMISSION CONTROL BASED ON RINGING TONES IN UNANSWERED CALLS

(75) Inventors: Benny Lennartson, Hagersten (SE); Anders Johansson, Lulea (SE); Arne Simonsson, Gammelstad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 259 days.

(21) Appl. No.: 13/001,746

(22) PCT Filed: Jul. 1, 2008

(86) PCT No.: PCT/SE2008/050809
§ 371 (c)(1),
(2), (4) Date: Dec. 28, 2010

(87) PCT Pub. No.: WO2010/002299
PCT Pub. Date: Jan. 7, 2010

(65) Prior Publication Data
US 2011/0110259 A1 May 12, 2011

(51) Int. Cl.
*G01R 31/08* (2006.01)
*H04W 80/04* (2009.01)
*H04W 24/00* (2009.01)
*H04W 4/16* (2009.01)

(52) U.S. Cl.
USPC .......... 370/252; 370/230; 370/229; 370/237; 370/328; 455/428; 455/445

(58) Field of Classification Search
USPC .................. 370/241, 252; 455/422.1, 423
See application file for complete search history.

(56) References Cited

U.S. PATENT DOCUMENTS

| | | | |
|---|---|---|---|
| 6,999,775 B1* | 2/2006 | Tikka | 455/453 |
| 7,242,666 B2* | 7/2007 | Hayashi et al. | 370/230 |
| 7,310,529 B1* | 12/2007 | Lodge et al. | 455/445 |
| 8,224,368 B2* | 7/2012 | Leonard | 455/522 |
| 2003/0218974 A1* | 11/2003 | Zuniga | 370/229 |
| 2006/0079268 A1* | 4/2006 | Livet et al. | 455/522 |
| 2008/0008298 A1* | 1/2008 | Kirla | 379/88.03 |
| 2008/0170555 A1* | 7/2008 | Tsunehara et al. | 370/342 |

FOREIGN PATENT DOCUMENTS

| | | |
|---|---|---|
| EP | 0889663 A1 | 1/1999 |
| KR | 20040046069 | 6/2004 |
| WO | 2006/010958 A2 | 2/2006 |

OTHER PUBLICATIONS

Gunnarsson, F. et al. "Uplink Admission Control in WCDMA Based on Relative Load Estimates." 2002 International Conference on Communications, vol. 5, Aug. 7, 2002.

* cited by examiner

Primary Examiner — Un C Cho
Assistant Examiner — Peian Lou
(74) Attorney, Agent, or Firm — Coats & Bennett, PLLC

(57) ABSTRACT

A base station in a wireless network measures a total transmission power associated with calls in a cell of the wireless network, where the calls include answered calls and unanswered calls that originated in the cell. The base station further compares the measured total transmission power with a power threshold and performs at least one of the following: muting at least one of the unanswered calls downlink voice path based on the comparison, or disconnecting at least one of the unanswered calls based on the comparison.

25 Claims, 11 Drawing Sheets

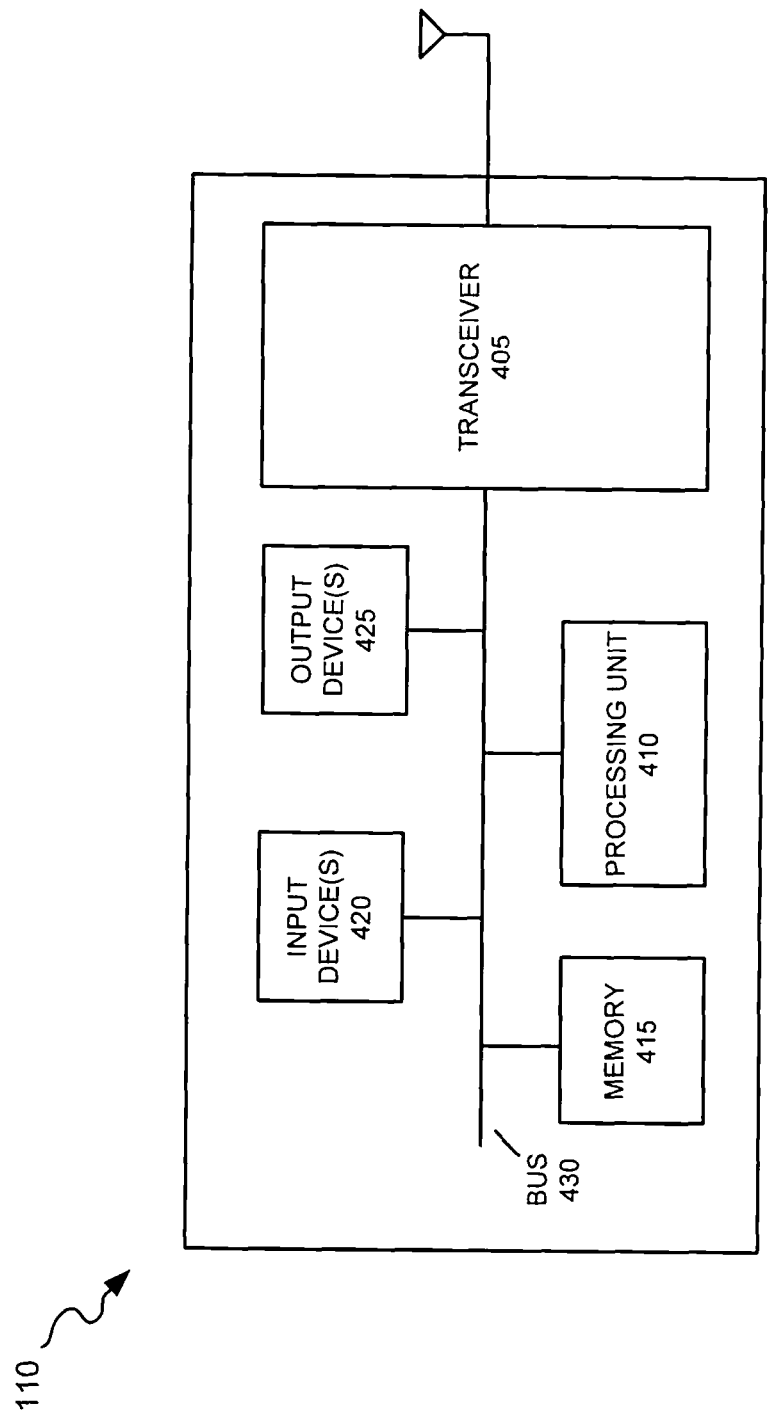

… … …

CELLULAR CONGESTION AND ADMISSION CONTROL BASED ON RINGING TONES IN UNANSWERED CALLS

TECHNICAL FIELD

Implementations described herein relate generally to wireless communication systems and, more particularly, to the differential handling of unanswered calls with ringing tones relative to answered calls, with respect to congestion and admission control, in wireless communication systems.

BACKGROUND

In both Long Term Evolution (LTE) and Wideband Code Division Multiple Access (WCDMA) wireless communication systems, ringing tones can be heard on the downlink at the call-originating user equipment (UE) during the period from when the call is initiated until the called party answers the call. These ringing tones are typically generated in the target Mobile Switching Center (MSC) (e.g., the MSC associated with the called party) and sent back to the call-originating UE through the serving MSC (e.g., the MSC serving the call-originating UE). In the case where the called party is located in the Public Switched Telephone Network (PSTN), the ringing tones may be generated in the PSTN and sent back to the call originating UE.

The ringing tones that are sent back to the call-originating UE, during the period after the call is initiated and prior to the called party answering the call, are transmitted over a traffic channel in the radio network on a downlink to the UE. From an investigation of speech bursts in WCDMA networks, it has been determined that approximately 5% of speech bursts are generated by ringing tones, or about 2% of the downlink activity. Approximately 5% of downlink time consists of ringing tones.

At the generation of the ringing tones when a call is initiated prior to the call being answered, the load on the radio interface in the cell serving the call-originating UE will increase, potentially causing congestion that can disturb other calls in the cell. This added congestion due to the presence of ringing tones in the cell can, in certain instances, force disconnection of established calls. When the ringing tones happen to be coincident for several calls, several forced disconnections can occur at the same time. The presence of ringing tones on the downlink in cells of a wireless communication system may, therefore, have a detrimental impact on service in the cells in certain circumstances.

SUMMARY

Exemplary embodiments described herein enable the differential handling of unanswered calls with ringing tones relative to answered calls, with respect to congestion and admission control in a wireless communication system. Calls having ringing tone data payloads may be prioritized lower than answered calls with respect to cell congestion and/or admission. For example, calls having ringing tone data payloads (e.g., unanswered calls) may be selectively disconnected, or downlink transmissions from the base station associated with the calls may be selectively switched to discontinuous transmission (DTX) mode, to improve service quality in the cell. In exemplary embodiments, a total transmission power in the cell may be measured and compared to a power threshold to decide whether to selectively disconnect one or more unanswered calls, or switch to DTX mode downlink transmissions associated with one or more unanswered calls. In some implementations, answered calls may be selectively disconnected, when disconnecting the unanswered calls or switching the unanswered calls to DTX mode does not adequately improve the measured carrier power in the cell. In further implementations, the measured total transmission power may be used in determining whether to admit or reject new unanswered calls into the cell.

According to one aspect, a method implemented at a base station in a wireless network may include measuring a total transmission power associated with calls in a cell of the wireless network, where the calls include answered calls and unanswered calls that originated in the cell. The method may further include comparing the measured total transmission power with a power threshold. The method may also include performing at least one of the following: muting at least one of the unanswered calls' downlink voice path based on the comparison, or disconnecting at least one of the unanswered calls based on the comparison.

According to a further aspect, a wireless station in a network may include a power detector configured to measure total transmission power associated with calls in a cell associated with the wireless station, where the calls include answered calls and unanswered calls that originated in the cell. The wireless station may further include a control unit configured to: mute at least one of the unanswered calls' downlink voice paths based on the measured total transmission power, or disconnect at least one of the unanswered calls based on the measured total transmission power.

According to another aspect, a system may include means for measuring total transmission power associated with calls in a cell of a wireless network, where the calls include answered calls and unanswered calls that originated in the cell. The system may further include means for determining whether frames or packets associated with the calls contain ringing tones and means for identifying ones of the calls as unanswered calls based on the determination. The system may also include means for muting selected ones of the identified unanswered calls' downlink voice paths based on the measured total transmission power using one or more of: discontinuous transmission to mute the selected ones of the identified unanswered call's downlink voice paths, dropping speech frames associated with the selected ones of the identified unanswered calls, or applying a lower scheduling priority to the selected ones of the identified unanswered calls.

BRIEF DESCRIPTION OF THE DRAWINGS

The accompanying drawings, which are incorporated in and constitute a part of this specification, illustrate one or more embodiments of the invention and, together with the description, explain the invention. In the drawings:

FIG. 4A illustrates exemplary components of a device of FIG. 1;

DETAILED DESCRIPTION

The following detailed description of the invention refers to the accompanying drawings. The same reference numbers in different drawings may identify the same or similar elements. Also, the following detailed description does not limit the invention.

The concepts described herein relate to a communication system. The communication system is intended to be broadly interpreted to include any type of wireless network, such as a cellular network and/or a mobile network (e.g., Global System for Mobile Communications (GSM), Long Term Evolution (LTE), Wideband Code Division Multiple Access (WCDMA), Ultra Mobile Broadband (UMB), Universal Mobile Telecommunications Systems (UMTS), Code Division Multiple Access 2000 (CDMA2000), ad hoc networks, High-Speed Packet Access (HSPA), etc.), and a non-cellular network (e.g., Wireless Fidelity (Wi-Fi), Worldwide Interoperability for Microwave Access (WiMax), etc.). In this regard, it will be appreciated that the concepts described herein are not platform dependent and may be implemented within a wide variety of communication systems. The terms communication system and network may be used interchangeably throughout this description.

Figure 1:
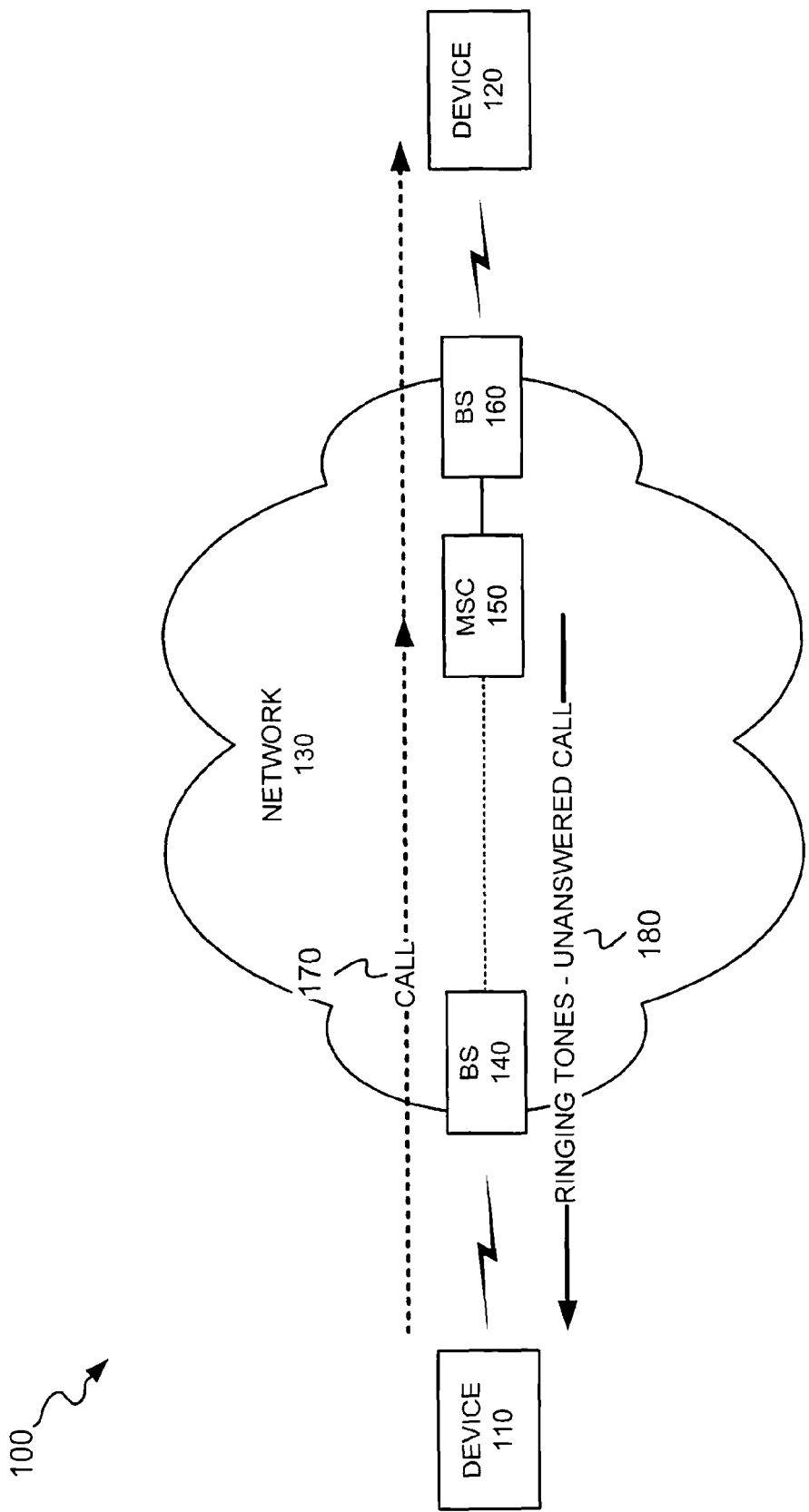
FIG. 1 illustrates an exemplary communications system in which implementations described herein may be implemented.

FIG. 1 illustrates an exemplary communications system 100 that may include devices 110 and 120 connected to a network 130. As shown in FIG. 1, device 110 may communicate with device 120 via a network 130 in system 100. In one implementation, device 110 may communicate with one or more other devices that act as intermediate devices between device 110 and device 120. For example, as shown in FIG. 1, a base station (BS) 140 (e.g., a wireless station), a mobile switching center (MSC) 150, and a base station 160 may reside as intermediate devices of network 130 that may be used to facilitate end-to-end communication between devices 110 and 120.

Devices 110 and 120 may include, for example, a cellular radiotelephone, a personal digital assistant (PDA), a Personal Communications Systems (PCS) terminal, a laptop computer, a palmtop computer, or any other type of device or appliance that includes a communication transceiver that permits devices 110 and 120 to communicate with other devices via a wireless link. The PCS terminal may, for example, combine a cellular radiotelephone with data processing, facsimile and data communications capabilities. The PDA may include, for example, a radiotelephone, a pager, an Internet/intranet access device, a web browser, an organizer, calendars and/or a global positioning system (GPS) receiver. Devices 110 and 120 may be referred to as a "pervasive computing" device. In some implementations, device 120 may include a telephone (e.g., a Plain Old Telephone system (POTs) telephone) that is connected to a Public Switched Telephone Network (PSTN).

Network(s) 130 may include one or more networks of any type, including a local area network (LAN); a wide area network (WAN); a metropolitan area network (MAN); a telephone network, such as a PSTN or a PLMN; a satellite network; an intranet, the Internet; or a combination of networks. The PLMN(s) may further include a packet-switched subnetwork, such as, for example, General Packet Radio Service (GPRS), Cellular Digital Packet Data (CDPD), or Mobile IP network.

FIG. 1 further depicts device 110 initiating a call 170 to device 120 via network 130. As shown, MSC 150, which is the MSC that serves device 120, may receive call 170 and may, during a period over which the called party at device 120 has not answered call 170, send ringing tones 180 back to device 110 via base station 140. Device 110 may receive ringing tones 180 on a radio interface downlink from base station 140. Device 110 may continue to receive ringing tones 180 on the downlink until the called party at device 120 answers call 170, at which time MSC 150 discontinues the sending of ringing tones 180 to device 110 and call 170 may be connected through to device 120. Alternatively, device 110 may continue to receive ringing tones 180 on the downlink until the calling party associated with device 110 terminates the call, or the call is terminated/disconnected by a component of network 130.

In exemplary embodiments described herein, base station 140 may handle calls differently with respect to cell congestion and/or admission based on whether the calls include ringing tones 180 (e.g., are unanswered calls), as further described below. "Ringing tones" as referred to herein may include any type of information sent back to the call originating part (e.g., device 110 or BS 140 that originated the call) subsequent to the initiation of the call but prior to the call being answered or disconnected, such as, for example, a busy tone, a congestion tone, a special information tone(s), re-routing information, etc. "Ringing tones" as referred to herein may not be limited to "tones" but may also include music, or other audio information, such as, for example, click sounds.

Figure 2:
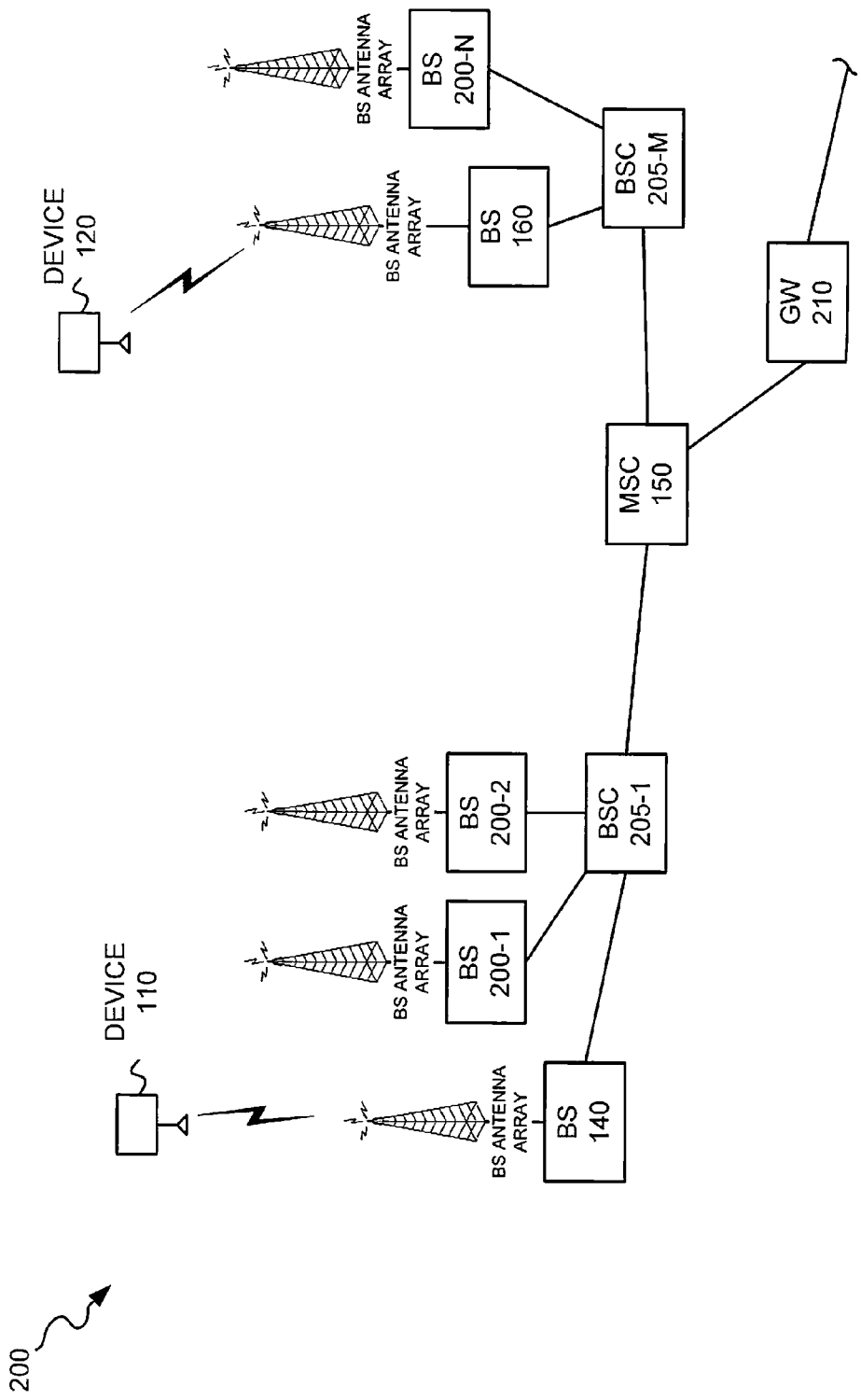
FIG. 2 illustrates an exemplary implementation in which a network of the system of FIG. 1 includes a Public Land Mobile Network (PLMN)

FIG. 2 illustrates an example of system 100 of FIG. 1, where network 130 includes a PLMN 200. As shown in FIG. 2, devices 110 and 120 may include cellular radiotelephones. PLMN 200 may include one or more base station controllers (BSCs) 205-1 through 205-M (alternatively called "radio network controllers" (RNCs) in some implementations), multiple base stations (BSs) 140, 160 and 200-1 through 200-N along with their associated antenna arrays, one or more mobile switching centers (MSCs), such as MSC 150, and one or more gateways (GWs), such as GW 210. PLMN 200 may additionally include components (not shown) for connecting PLMN 200 to a packet-switched network, such as a Packet Data Network (PDN), such that devices 110 or 120 can send or receive packet-switched data from the PDN. The components for connecting PLMN 200 to the PDN may include a Serving GPRS Support Node (SGSN) and a Gateway GPRS Support Node (GGSN) (not shown).

Base stations 140, 160 and 200-1 through 200-N may format the data transmitted to, or received from, the antenna arrays in accordance with existing techniques and may communicate with BSCs 205-1 through 205-M or with a device, such as device 110. Among other functions, BSCs 205-1 through 205-M may route received data to either MSC 150 or a base station (e.g., BSs 140, 160 or 200-1 through 200-N). MSC 150 may route received data to BSC 205-1, 205-M, or GW 210. GW 210 may route data received from an external domain (not shown) to an appropriate MSC (such as MSC 150), or from an MSC to an appropriate external domain. In one implementation, the external domain may include a different PLMN or a PSTN.

Figure 3:
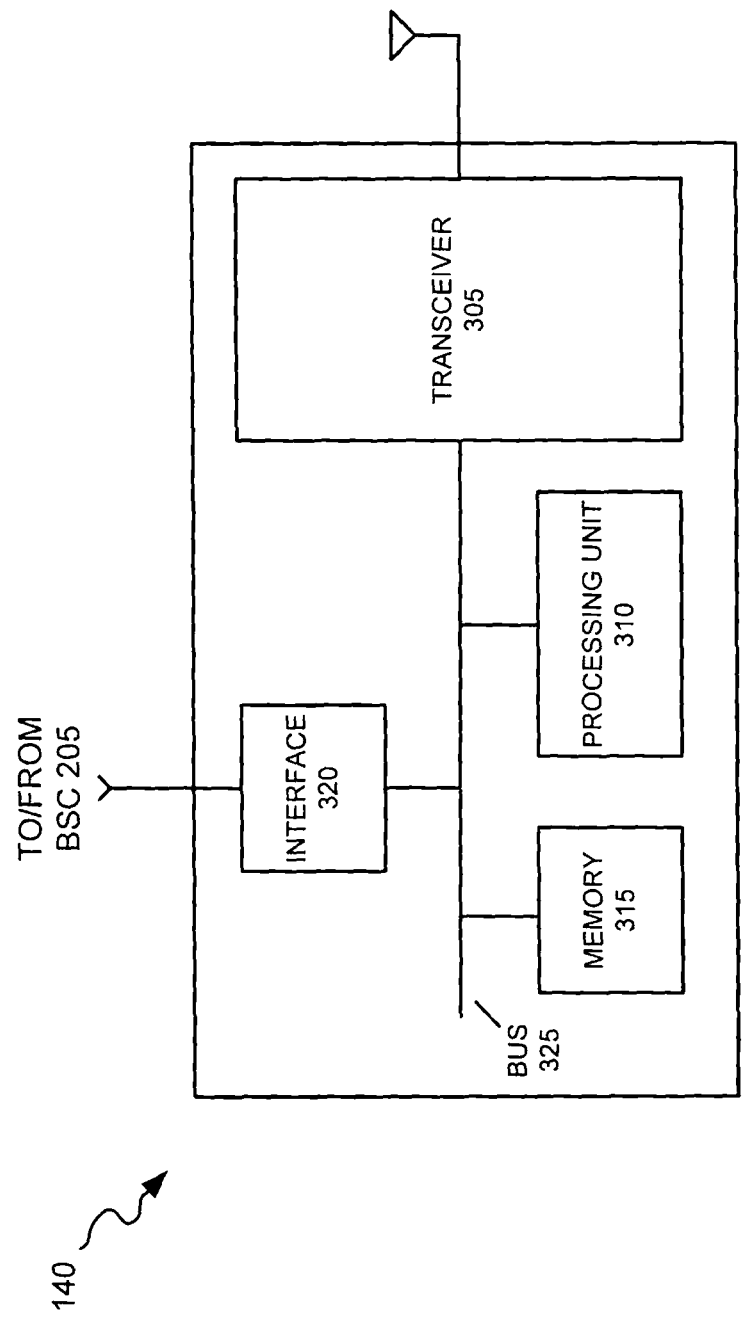
FIG. 3 illustrates exemplary components of a base station of FIG. 2.

FIG. 3 illustrates one exemplary implementation of BS 140. Base stations 160 and 200-1 through 200-N may be similarly configured. BS 140 may include a transceiver 305, a processing unit 310, a memory 315, an interface 320 and a bus 325.

Transceiver 305 may include transceiver circuitry for transmitting and/or receiving symbol sequences using radio frequency signals via one or more antennas. Processing unit 310 may include a processor, microprocessor, or processing logic that may interpret and execute instructions. Processing unit 310 may perform all device data processing functions. Memory 315 may provide permanent, semi-permanent, or temporary working storage of data and instructions for use by processing unit 310 in performing device processing functions. Memory 315 may include read only memory (ROM), random access memory (RAM), large-capacity storage devices, such as a magnetic and/or optical recording medium and its corresponding drive, and/or other types of memory devices. Interface 320 may include circuitry for interfacing with a link that connects to a BSC (e.g., BSC 205-1 or BSC 205-2). Bus 325 may interconnect the various components of BS 140 to permit the components to communicate with one another.

The configuration of components of BS 140 illustrated in FIG. 3 is for illustrative purposes only. Other configurations with more, fewer, or a different arrangement of components may be implemented.

FIG. 4A illustrates exemplary components of device 110. Device 120 may be similarly configured. Device 110 may include a transceiver 405, a processing unit 410, a memory 415, an input device(s) 420, an output device(s) 425, and a bus 430.

Transceiver 405 may include transceiver circuitry for transmitting and/or receiving symbol sequences using radio frequency signals via one or more antennas. Transceiver 405 may include, for example, a RAKE or a GRAKE receiver. Processing unit 410 may include a processor, microprocessor, or processing logic that may interpret and execute instructions. Processing unit 410 may perform all data processing functions for inputting, outputting, and processing of data including data buffering and device control functions, such as call processing control, user interface control, or the like.

Memory 415 may provide permanent, semi-permanent, or temporary working storage of data and instructions for use by processing unit 410 in performing device processing functions. Memory 415 may include ROM, RAM, large-capacity storage devices, such as a magnetic and/or optical recording medium and its corresponding drive, and/or other types of memory devices. Input device(s) 420 may include mechanisms for entry of data into device 110. For example, input device(s) 420 may include a key pad (not shown), a microphone (not shown) or a display unit (not shown). The key pad may permit manual user entry of data into device 110. The microphone may include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 425 may include mechanisms for outputting data in audio, video and/or hard copy format. For example, output device(s) 425 may include a speaker (not shown) that includes mechanisms for converting electrical signals into auditory output. Output device(s) 425 may further include a display unit that displays output data to the user. For example, the display unit may provide a graphical user interface that displays output data to the user. Bus 430 may interconnect the various components of device 110 to permit the components to communicate with one another.

The configuration of components of device 110 illustrated in FIG. 4A is for illustrative purposes only. Other configurations with more, fewer, or a different arrangement of components may be implemented.

Figure 4B:
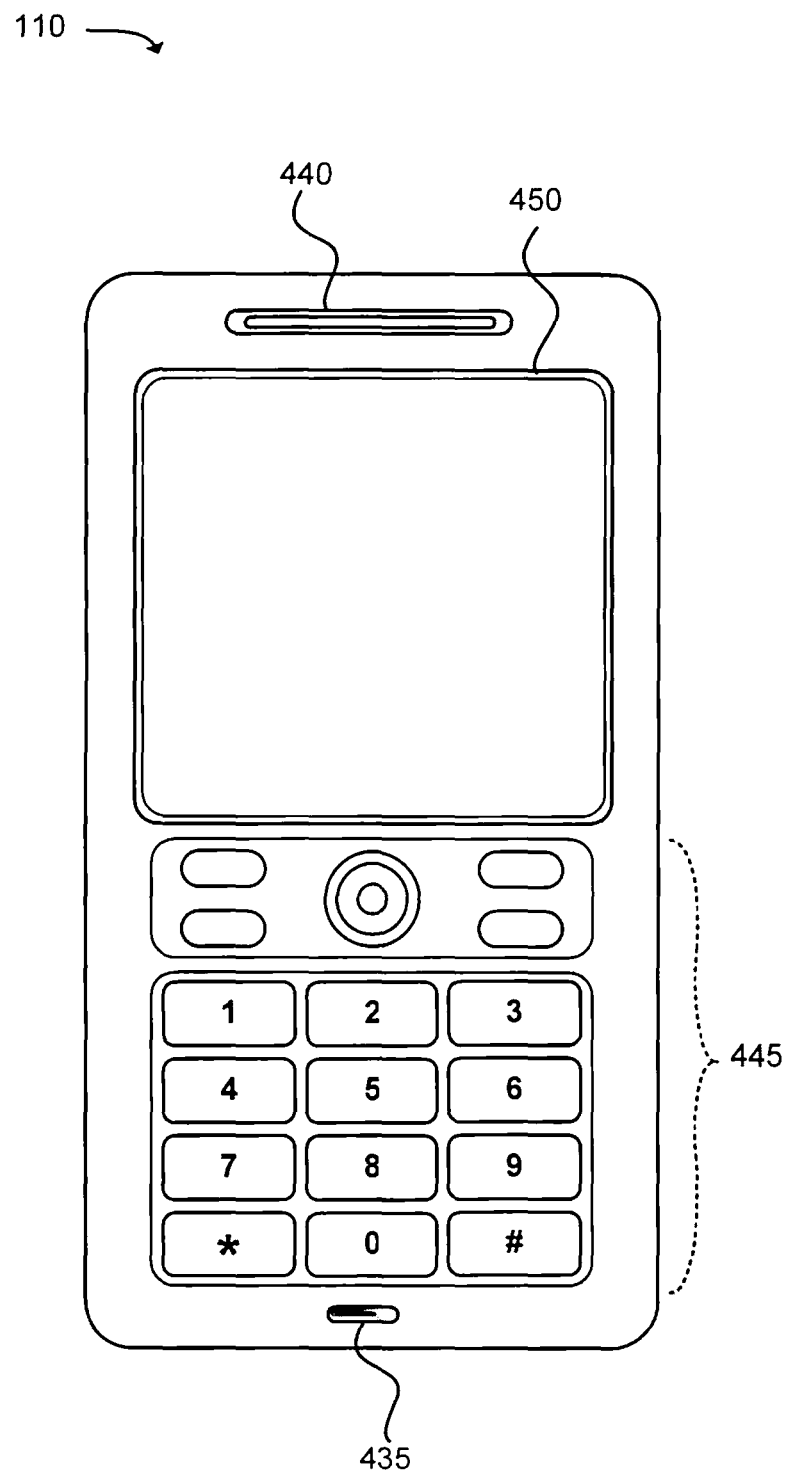
FIG. 4B illustrates an exemplary implementation of the device of FIG. 4A where the device includes a cellular radiotelephone.

FIG. 4B illustrates an exemplary implementation of device 110 in which device 110 includes a cellular radiotelephone. As shown in FIG. 4B, the cellular radiotelephone may include a microphone 435 (e.g., of input device(s) 420) for entering audio information into device 110, a speaker 440 (e.g., of output device(s) 425) for providing an audio output from device 110, a keypad 445 (e.g., of input device(s) 420) for manual entry of data or selection of device functions, and a display 450 (e.g., of input device(s) 420 or output device(s) 425) that may visually display data to the user and/or which may provide a user interface that the user may use to enter data or to select device functions (in conjunction with keypad 445).

Figure 5:
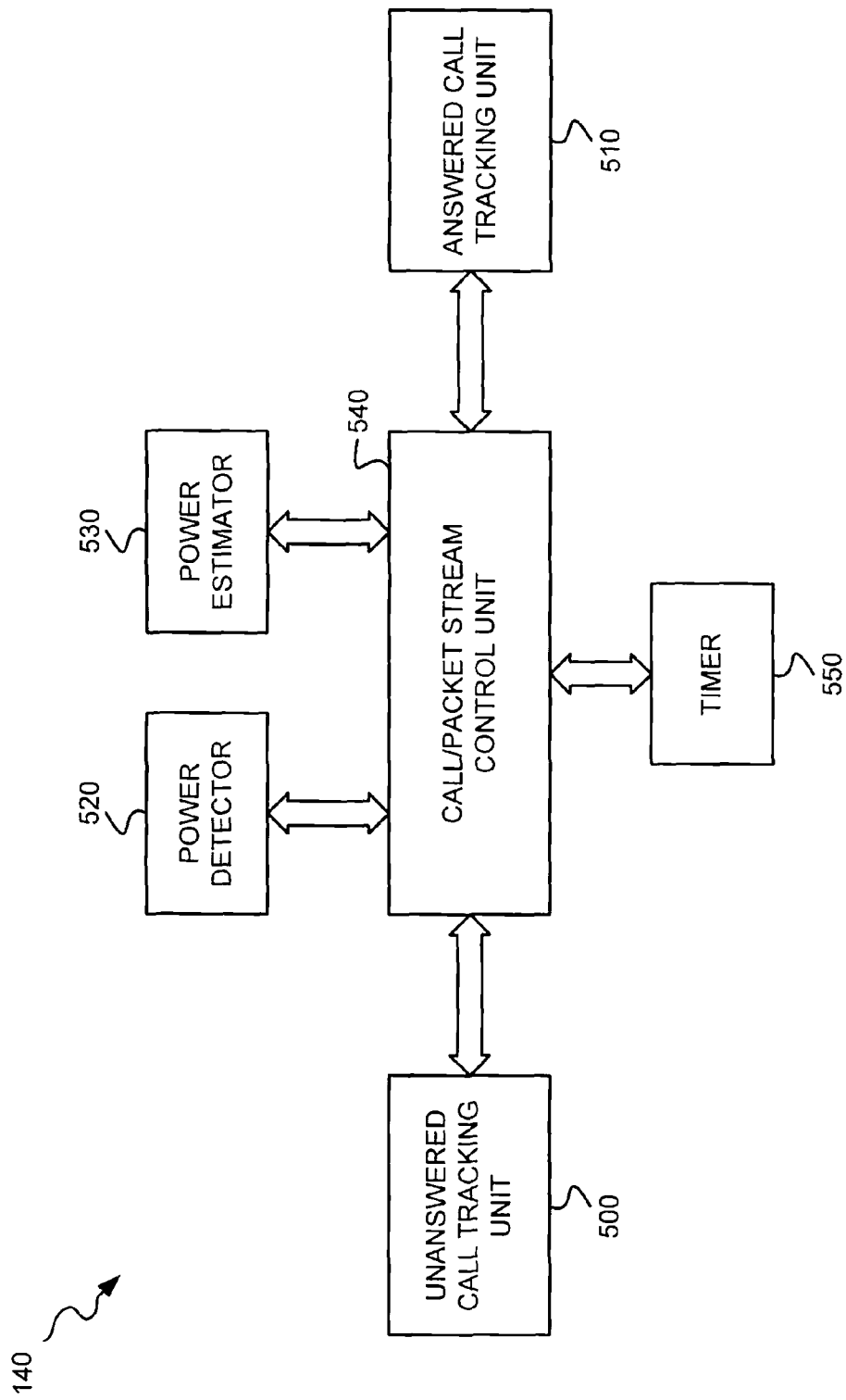
FIG. 5 illustrates a functional diagram of the base station of FIG. 3.

FIG. 5 illustrates a functional diagram of base station 140. As shown, base station 140 may include an unanswered call tracking unit 500, an answered call tracking unit 510, a power detector 520, a power estimator 530, a call/packet stream control unit 540 and a timer 550.

Unanswered call tracking unit 500 may inspect the data payloads of frames or packets received at base station 140, associated with calls originating in base station's cell, to identify if the data payloads contain ringing tones. If the data payloads contain ringing tones, unanswered call tracking unit 500 may identify the call associated with the data payload as being "unanswered." Unanswered call tracking unit 500 may keep track of all new calls originating in the cell to identify whether they are in an "unanswered" status.

Answered call tracking unit 510 may inspect the data payloads of frames or packets received at base station 140, associated with calls originating in base station's cell, to identify if the data payloads contain ringing tones. If the data payloads do not contain ringing tones, answered call tracking unit 510 may identify the call associated with the data payload as being "answered." Answered call tracking unit 510 may keep track of all new calls originating in the cell to identify whether they are in an "answered" status.

Power detector 520 may measure a total transmission power ($P_{TOT}$) in the cell (e.g., a total carrier power in a WCDMA communication system) associated with base station 140. The total transmission power ($P_{TOT}$) may include transmission power associated with answered calls, unanswered calls that originated in the cell, answered calls that terminated in the cell, and packet data transmitted in the cell. Power detector 520 may additionally measure power ($P_{UNANSWERED}$) used by all unanswered calls in the cell associated with base station 140 that are not in discontinuous transmission mode. Power detector 520 may conduct these power measurements continuously, periodically, or at required instances of time. Power detector 520 may provide power measurements to call/packet stream control unit 540. The total transmitted power measurement can be performed by measuring channel utilization when a fixed power is used per transmission unit, channel or scheduling block. This can be applicable on frequency domain scheduled accesses, such as Worldwide Interoperability for Microwave Access (WiMax) and Long Term Evolution (LTE), where resource blocks are scheduled on a shared channel The total transmitted power may then be the number of scheduled resource blocks per transmission frame times the power per resource block.

Power estimator 530 may estimate a ringing power ($P_{RINGING}$) used by ringing tone payloads in base station 140's cell based on, for example, the relation $P_{RINGING}=f_{RINGING}*P_{UNANSWERED}$. $f_{RINGING}$ can be set according to control and data power transport format and offsets (e.g., beta factors in WCDMA). Alternatively, $f_{RINGING}$ may be set to reduce the estimated power to the average ringing tone power over time. For example, if the ringing tone is one second and the pause is 4 seconds, the average power will be 20% of the power when the ringing tone is sent (e.g., 1/(1+4)) and $f_{ringing}$ can be set to 0.2. In another alternative, $f_{ringing}$ may be set to represent the average DTX factor to speech to approximate the admission level if the call is answered. If the average voice activity factor is 50% in the network, $f_{ringing}$ may be set to 0.5, thus, predicting the average power that may be used if the call is answered. Power estimator 530 may provide the estimated power to call/packet stream control unit 540.

Call/packet stream control unit 540 may control the switching of transmission modes (e.g., from non-DTX mode to DTX mode) for calls that originate in base station 140's cell based on information received from power detector 520 and call tracking units 500 and 510, as described further below. Control unit 540 may further control the disconnection of unanswered or answered calls that originated in base station 140's cell based on information received from power detector 520 and call tracking units 500 and 510, as described further below. Control unit 540 may also control admission of unanswered calls into base station 140's cell based on information received from power detector 520, power estimator 530, and call tracking units 500 and 510, as described further below. Control unit 540 may additionally act as a scheduling unit for the scheduling of speech frames on a shared channel, such as the Physical Downlink Shared Channel (PDSCH) in LTE. Control unit 540 may further implement muting by dropping speech frames associated with a call. Control unit 540 may additionally implement muting by giving data associated with a call lower scheduling priority and/or increasing delay associated with the data.

Timer 550 may include a clock that keeps a current time and which also may determine the passage of certain intervals of time.

Base station 140 may include a different arrangement of functional components than those shown in FIG. 5. For example, base station 140 may include fewer, or additional, functional components than those shown in FIG. 5. In one implementation, base station 140 may not include units 500 and 510. In such an implementation, call answer information may be sent with control signals for other purposes, such as, for example, connecting an uplink speech path and/or for accounting purposes. This control signal information may be used instead of, or in addition to, using units 500 and 510.

Figure 6:
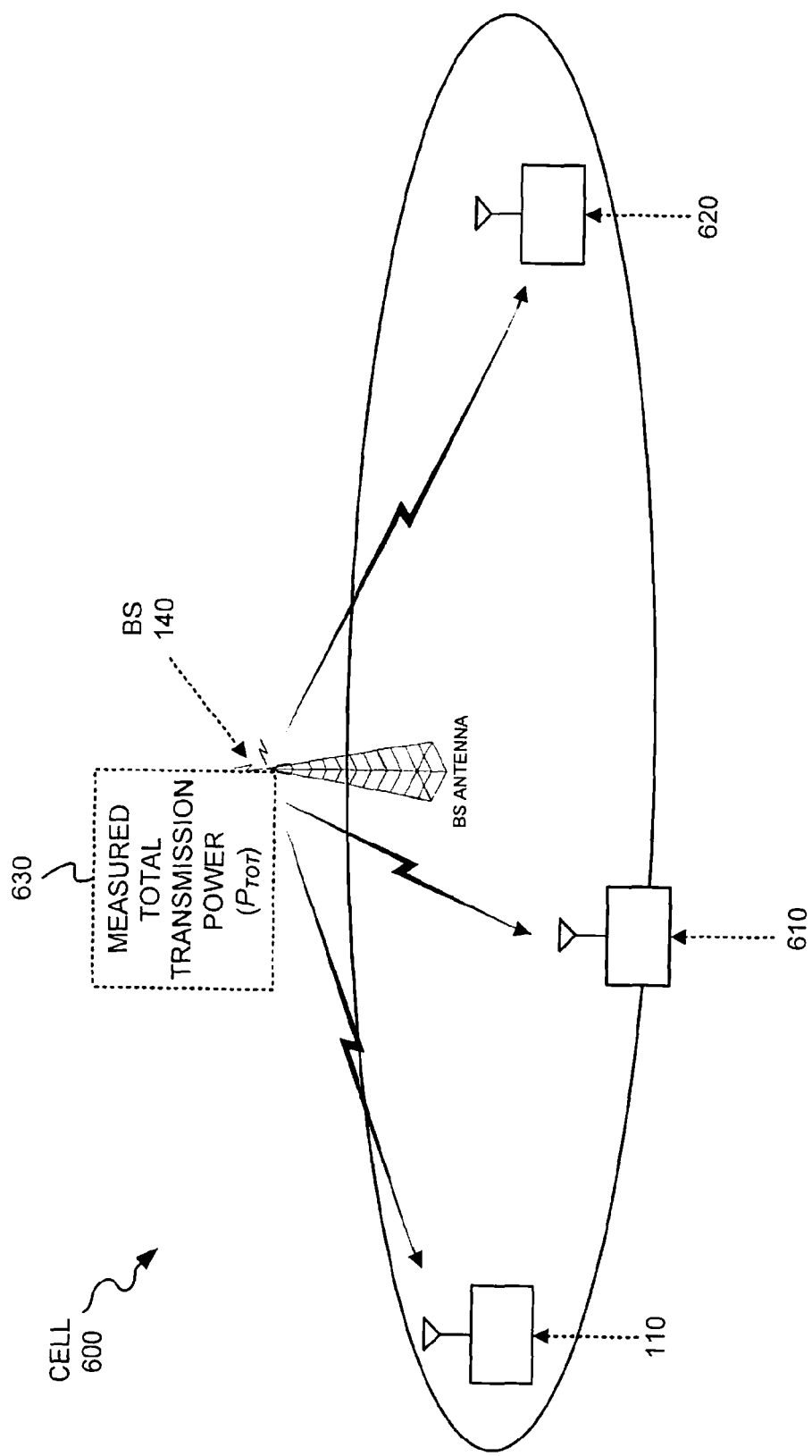
FIG. 6 depicts the measurement of total transmission power in a cell of the PLMN of FIG. 2.

FIG. 6 illustrates base station 140 performing power measurements associated with radio frequency transmissions occurring between base station 140 and various devices that are located in base station 140's cell 600. As shown, base station 140 may be simultaneously serving multiple devices, including device 110 and devices 610 and 620, in cell 600. Base station 140 may conduct total transmission power ($P_{TOT}$) measurements 630 and may use the results of those measurements as a basis for differential handling, with respect to congestion and admission control, of unanswered calls (with ringing tones) relative to answered calls. In certain circumstances, base station 140 may switch to DTX mode on the downlink for selected unanswered calls originating from selected ones of devices 110, 610 or 620 based on the carrier power measurements. In other circumstances, base station 140 may disconnect selected unanswered calls originating from devices 110, 610 or 620 based on the total transmission power ($P_{TOT}$) measurements.

Figure 7:
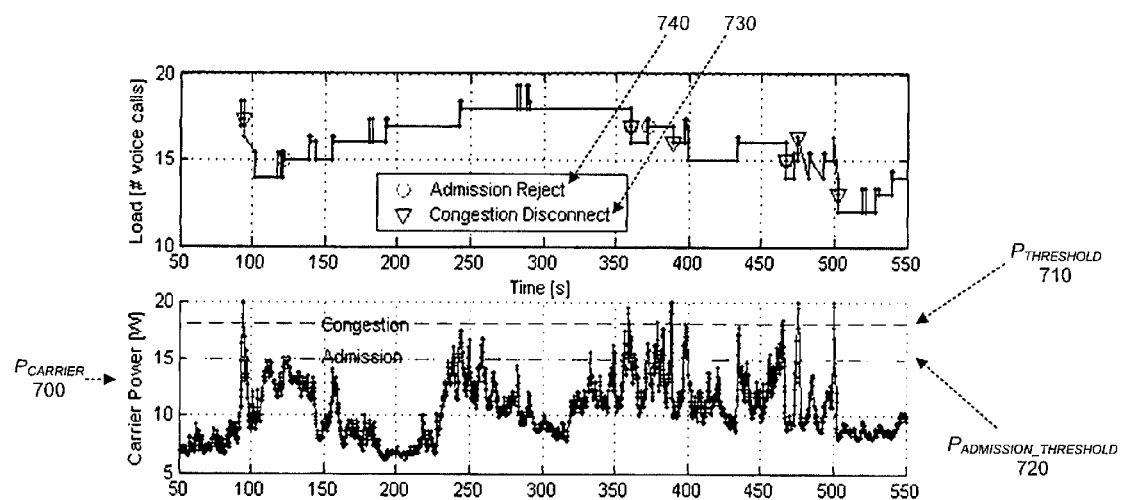
FIG. 7 illustrates examples of plots of WCDMA voice load and carrier power in a cell of the PLMN of FIG. 2.

FIG. 7 illustrates examples of plots of WCDMA voice load and carrier power in a cell associated with base station 140, where BS 140 operates in a WCDMA communication system. The plots of FIG. 7 depict illustrative examples of carrier power levels associated with disconnection of unanswered calls in a cell or with the control of admission of unanswered calls into the cell. As shown in FIG. 7, measured carrier power levels 700 in the cell can be compared with a congestion power threshold ($P_{THRESHOLD}$) 710 to cause a congestion disconnection 730 of an unanswered call. As further shown, measured carrier power levels 700 in the cell can be compared with an admission power threshold ($P_{ADMISSION\_THRESHOLD}$) 720 to control admission of unanswered calls (e.g., admission rejection 740) into the cell.

Figure 8A:
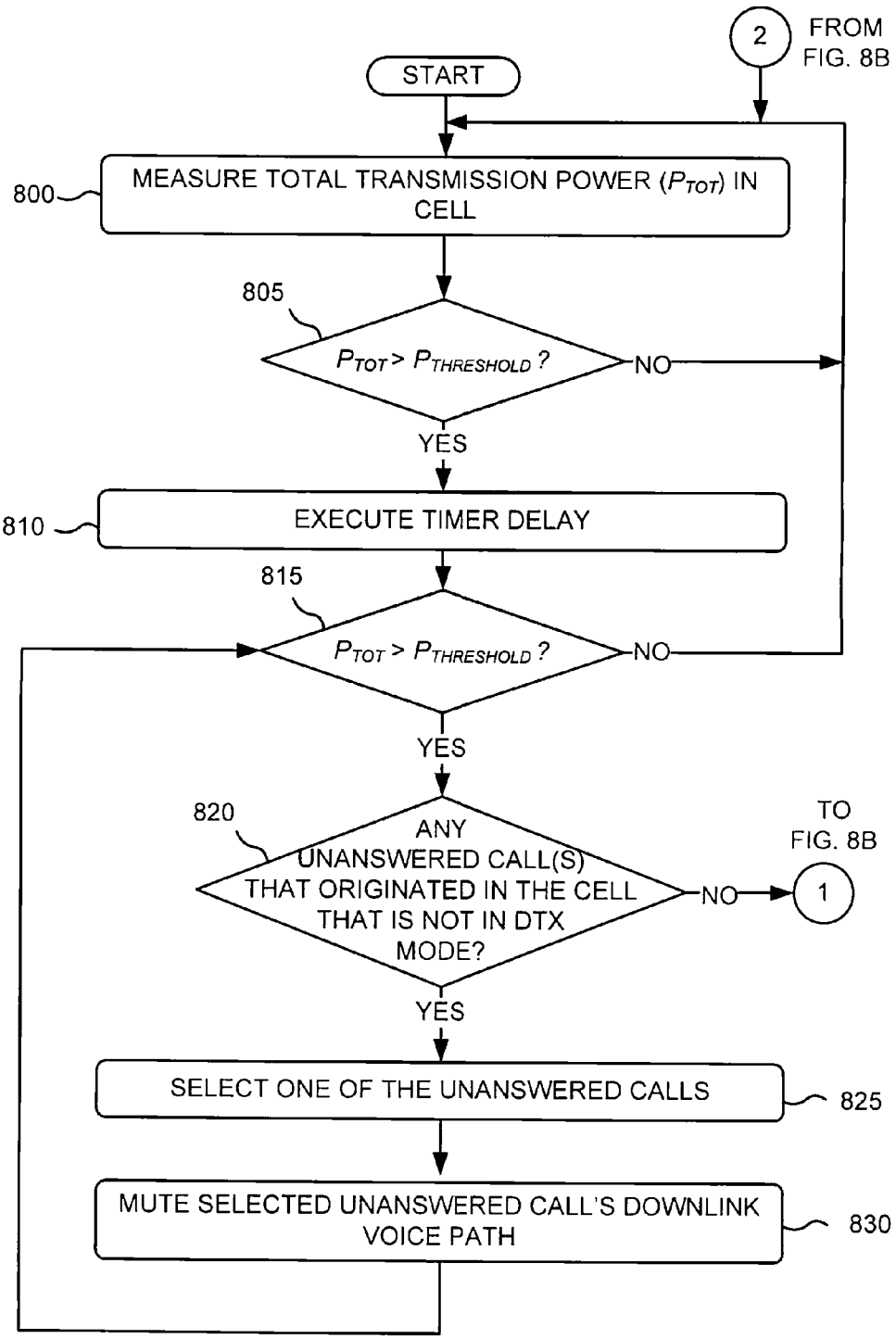
FIGS. 8A and 8B are flowcharts that illustrate exemplary operations associated with congestion control in a cell based on the presence of unanswered calls having ringing tones.
Figure 8B:
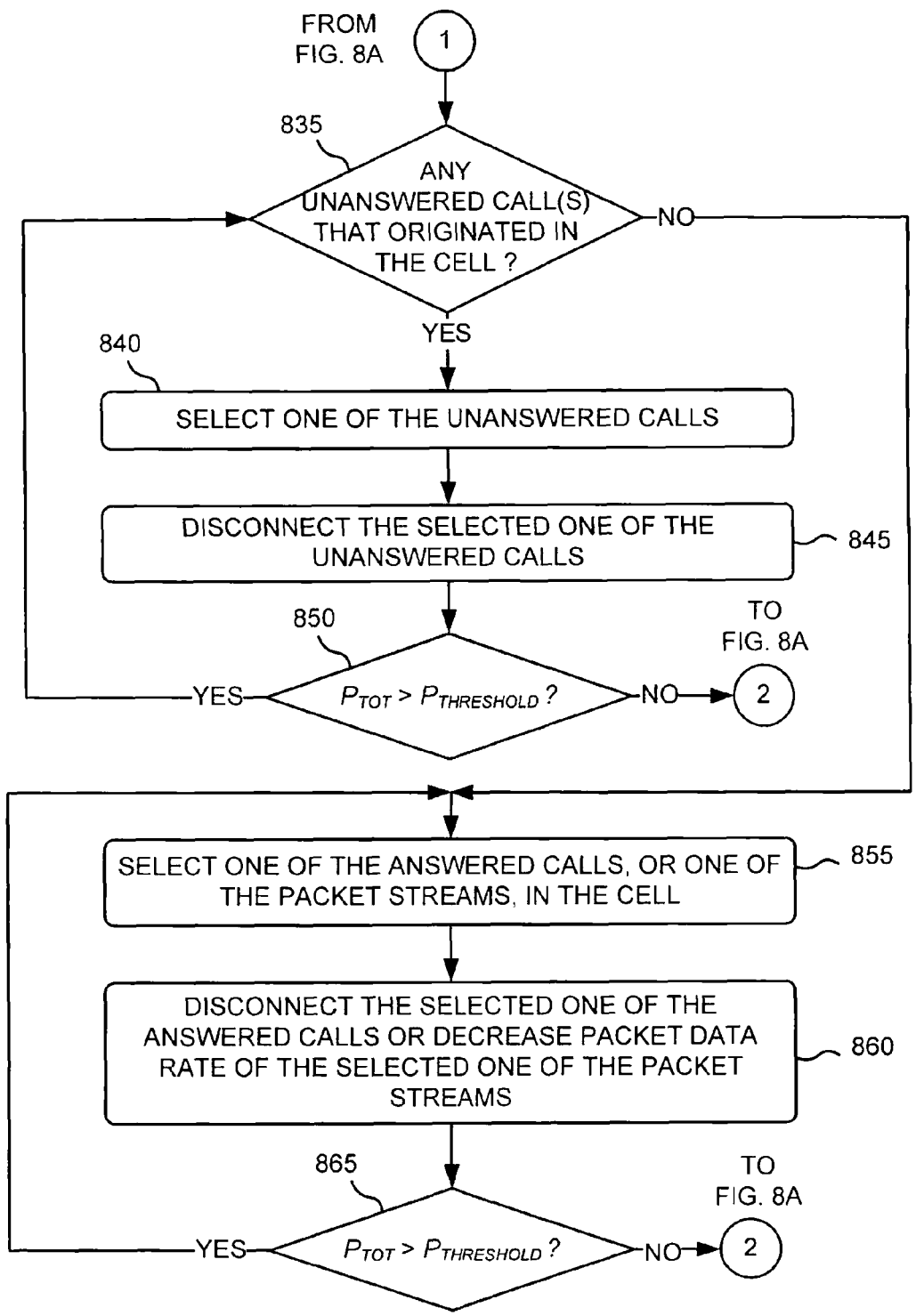

FIGS. 8A and 8B are flowcharts that illustrate exemplary operations associated with congestion control in a cell based on the presence of unanswered calls having ringing tones in the cell. The exemplary operations of FIGS. 8A and 8B may be performed by base station 140.

The exemplary operations may begin with the measurement of total transmission power ($P_{TOT}$) in the cell associated with base station 140 (block 800). Power detector 520 may measure the total transmission power ($P_{TOT}$) and provide the measurement to control unit 540.

A comparison may be made between the measured carrier power ($P_{TOT}$) and a power threshold ($P_{THRESHOLD}$) to determine if the measured transmission power exceeds the power threshold (e.g., $P_{TOT}>P_{THRESHOLD}$). Control unit 540 may use the transmission power measurement ($P_{TOT}$) received from power detector 520 when conducting the power comparison. The power threshold ($P_{THRESHOLD}$) may be a configurable value. If the comparison indicates that the measured transmission power ($P_{TOT}$) does not exceed the power threshold ($P_{THRESHOLD}$) (block 805—NO), then the exemplary operations may return to block 800. If the comparison indicates that the measured transmission power ($P_{TOT}$) does exceed the power threshold ($P_{THRESHOLD}$) (block 805—YES), then a timer delay may be executed (block 810). Timer 550 may implement the timer delay and may notify control unit 540 when the delay has ended. Subsequent to expiration of the timer delay, another comparison may be made between the current measured transmission power ($P_{TOT}$) and the pre-determined power threshold ($P_{THRESHOLD}$) to determine if the current measured transmission power continues to exceed the power threshold (e.g., $P_{TOT}>P_{THRESHOLD}$) (block 815). If not (block 815—NO), then the exemplary operations may return to block 800.

If the comparison indicates that the measured transmission power ($P_{TOT}$) continues to exceed the power threshold ($P_{THRESHOLD}$) (block 815—YES), then a determination may be made whether there are any unanswered calls that originated in the cell that are not in discontinuous transmission (DTX) mode. If there are no unanswered calls that originated in the cell currently present in the cell, or there are no unanswered calls that originated in the cell that are not in DTX mode currently present in the cell (block 820—NO), then the exemplary operations may continue at block 835 below. If there are one or more unanswered calls that originated in the cell currently present in the cell (block 820—YES), then one of the unanswered calls may be selected (block 825) and the selected unanswered call's downlink voice path may then be muted (block 830). In one implementation, the unanswered call's downlink voice path may be muted by sending on the downlink via DTX. Base station 140 may, thus, transmit on the downlink to device 110 for the selected call by operating in DTX mode. In another implementation, the unanswered call's downlink voice path may be muted by dropping speech data (e.g., frames) associated with the call. In a further implementation, the unanswered call's downlink voice path may be muted by giving the data associated with the call a lower scheduling priority. The above described exemplary techniques for muting the unanswered call's downlink voice path may, in some implementations, be used in combination. Control unit 540 may select one of the unanswered calls randomly, or based on other selection criteria. The exemplary operations may return to block 815 to determine whether additional unanswered calls should be selected for muting their downlink voice paths to reduce the measured carrier power.

In one implementation, blocks 825 and 830 may be selectively repeated to re-select which call(s) to mute at each speech frame or at each specified fraction of a second. If there are several unanswered calls to be selected from, each of the unanswered calls may be muted in a round robin fashion, muting one speech frame at a time, or half a ring tone period at a time per call. Instead of performing the loop of blocks 820, 825 and 830, a number of calls needed to be muted can be calculated in conjunction with the performance of block 820 and that number of calls may be selected in block 825.

At block 835, a determination may be made whether there are any unanswered calls, which originated in the cell, currently present in the cell. If not (block 835—NO), then the exemplary operations may continue at block 855 below. If there are one or more unanswered calls currently present in the cell (block 835—YES), then one of the unanswered calls may be selected (block 840) and the selected unanswered call may be disconnected (block 845). Control unit 540 may select one of the unanswered calls randomly or based on other selection criteria. For example, calls may be selected based on ring tone type. As a specific example, calls with busy tones and special information tones may be disconnected before calls awaiting answers. Base station 140 may, thus, disconnect the call between device 110 and, for example, device 120. A determination may then be made whether a current transmission power measurement ($P_{TOT}$) exceeds the power threshold ($P_{THRESHOLD}$) (block 850). If not (block 850—NO), then the exemplary operations may return to block 800. If the current carrier power measurement ($P_{TOT}$) exceeds the power threshold ($P_{THRESHOLD}$), then the exemplary operations may return to block 835 to determine whether additional unanswered calls should be disconnected to reduce the measured carrier power.

At block 855, one of the answered calls, or one of the packet streams, currently in progress in the cell may be selected (block 855). The selected one of the answered calls may be disconnected, or a packet data rate of the selected packet stream may be decreased (block 860). Control unit 540 may select the one of the answered calls based on information provided by answered call tracking unit 510. The one of the answered calls may be selected randomly, or based on other criteria. A determination may then be made whether a current transmission power measurement ($P_{TOT}$) exceeds the power threshold ($P_{THRESHOLD}$) (block 865). If not (block 865—NO), then the exemplary operations may return to block 800. If the current transmission power measurement ($P_{TOT}$) exceeds the power threshold ($P_{THRESHOLD}$), then the exemplary operations may return to block 855 to determine whether additional answered calls should be disconnected to reduce the measured carrier power.

The exemplary operations of FIGS. 8A and 8B may be selectively repeated. In one implementation, the exemplary operations may be repeated periodically (e.g., in a loop). In other implementations, certain portions of the exemplary operations of FIGS. 8A and 8B may be selectively repeated (as opposed to all of the operations of FIGS. 8A and 8B being repeated in sequence). In further implementations, even though particular operations of FIGS. 8A and 8B have been described in a particular sequence, they may be performed in a different sequence than described above. Additionally, certain groups operations of FIGS. 8A and 8B may be performed independently of the sequence of operations depicted in the figures. For example, blocks 800, 805, 810 and 815 may be performed with blocks 840 and 850 (i.e., eliminating blocks 820, 825 and 830). As another example, blocks 800, 805, 810 and 815 may be performed with blocks 855 and 860 (i.e., eliminating blocks 820, 825, 830, 840 and 845). In such implementations (or in other implementations described above), the timer delay of block 810 may be applied differently for muting and disconnection. For example, a shorter timer delay may be used for muting than for disconnection.

Figure 9:
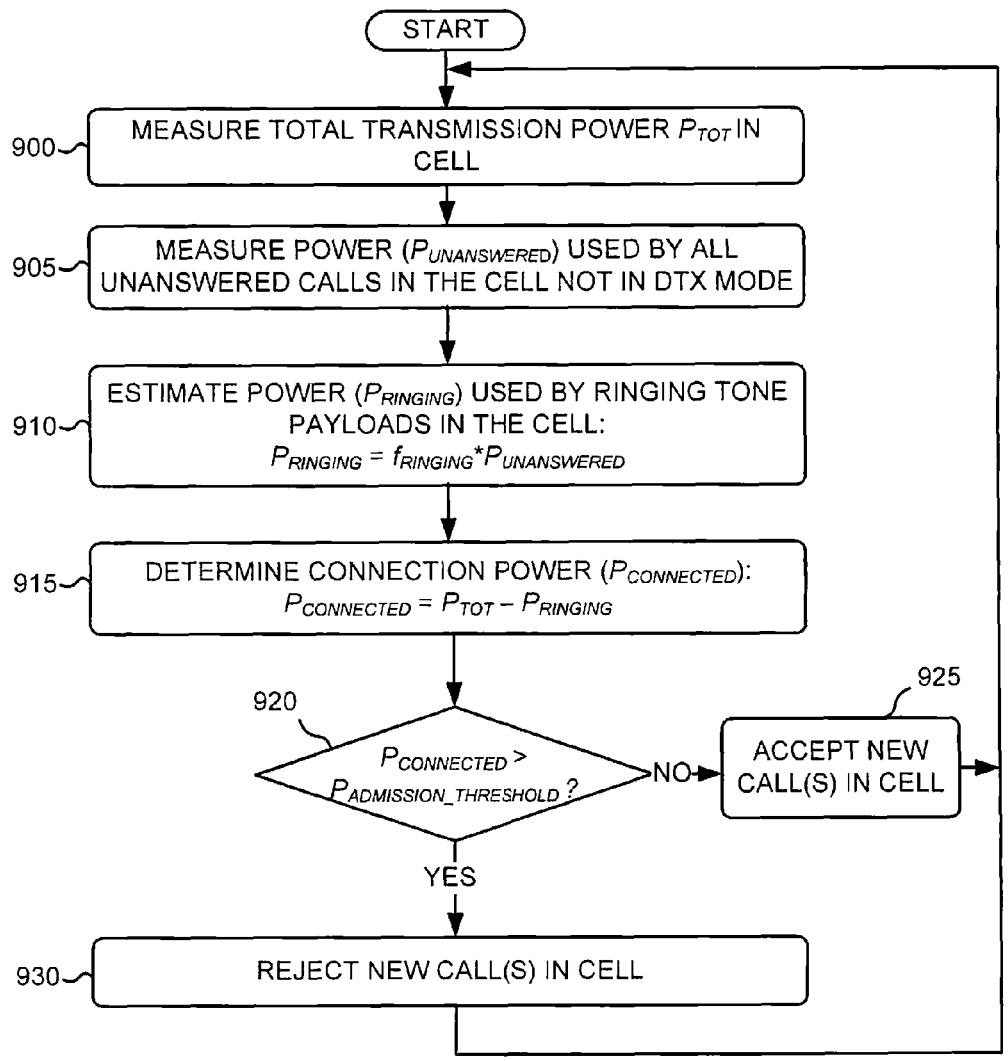
FIG. 9 is a flowchart that illustrates exemplary operations associated with admission control in a cell based on the presence of unanswered calls having ringing tones.

FIG. 9 is a flowchart that illustrates exemplary operations associated with admission control in a cell based on the presence of unanswered calls having ringing tones. The exemplary operations of FIG. 9 may be performed by base station 140.

The exemplary operations may begin with the measurement of total transmission power ($P_{TOT}$) in the cell associated with base station 140 (block 900). Power detector 520 may measure the transmission power ($P_{TOT}$) and provide the measurement to control unit 540. Power ($P_{UNANSWERED}$) used by all unanswered calls in the cell not in DTX mode may be measured (block 905). Power detector 520 may measure the power used by all unanswered calls in the cell not in DTX mode ($P_{UNANSWERED}$) and provide the measurement to control unit 540.

Power ($P_{RINGING}$) used by ringing tone payloads in the cell may be estimated (block 910). In one exemplary implementation, the power used by the ringing tone payloads in the cell may be estimated using the relation $P_{RINGING} = f_{RINGING} * P_{UNANSWERED}$.

A connection power ($P_{CONNECTED}$), which corresponds to the total power excluding the power associated with the ringing tone payloads, may be determined (block 915). In one exemplary implementation, the connection power ($P_{CONNECTED}$) may be determined using the relation $P_{CONNECTED} = P_{TOT} - P_{RINGING}$. Control unit 540 may perform the connection power determination using the relation $P_{CONNECTED} = P_{TOT} - P_{RINGING}$. In some implementations, the connection power $P_{CONNECTED}$ may also be measured directly by power detector 520.

A comparison may be made between the determined connection power ($P_{CONNECTED}$) and a power admission threshold ($P_{ADMISSION\_THRESHOLD}$) to determine if the determined connection power ($P_{CONNECTED}$) exceeds the power admission threshold ($P_{ADMISSION\_THRESHOLD}$) (block 920). Control unit 540 may use the connection power ($P_{CONNECTED}$), determined in block 915 above, when conducting the power comparison of block 920. If the comparison indicates that the connection power ($P_{CONNECTED}$) does not exceed the power admission threshold ($P_{ADMISSION\_THRESHOLD}$) (block 920—NO), then new calls in the cell may be accepted (block 925) and the exemplary operations may return to block 900. The new calls in the cell may include new calls that originate in the cell and new calls that terminate in the cell. Control unit 540 may, thus, permit (at least for a certain period of time) the admission of new calls into the cell. If the comparison indicates that the connection power ($P_{CONNECTED}$) does exceed the power admission threshold ($P_{ADMISSION\_THRESHOLD}$)

(block 920—YES), then new calls in the cell may be rejected (block 930) and the exemplary operations may return to block 900. The new calls in the cell may include new calls that originate in the cell and new calls that terminate in the cell. Control unit 540 may, thus, deny admission (at least for a certain period of time) to new calls.

The exemplary operations of FIG. 9 may be selectively repeated. In one implementation, the exemplary operations may be repeated periodically (e.g., in a loop). In other implementations, certain portions of the exemplary operations of FIG. 9 may be selectively repeated (as opposed to all of the operations of FIG. 9 being repeated in sequence).

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 8A, 8B and 9, the order of the blocks may be modified in other implementations consistent with the principles of the invention. Further, non-dependent blocks may be performed in parallel.

Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement the embodiments described herein is not limiting of the invention. Thus, the operation and behavior of the embodiments were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented at a base station in a wireless network, the method comprising:

measuring a total transmission power associated with calls in a cell of the wireless network, wherein the calls include answered and unanswered calls that originated in the cell;

if the total transmission power exceeds a first power threshold, implementing congestion control measures at the base station to reduce the total transmission power below the first power threshold, wherein implementing a congestion control measure on a call includes at least one of muting a downlink voice path of that call, decreasing a data rate of that call, and disconnecting that call, wherein implementing said congestion control measures comprises prioritizing the unanswered calls lower than the answered calls with respect to said congestion control measures, said implementing comprising at least one of:

iteratively selecting an unanswered call and disconnecting that call until either all of the unanswered calls are disconnected or the total transmission power falls below the first power threshold; and iteratively selecting an unanswered call whose downlink voice path is not muted and muting that downlink voice path, until either the downlink voice paths of all of the unanswered calls are muted or the total transmission power falls below the first power threshold; and if the total transmission power does not exceed the first power threshold, refraining from implementing said congestion control measures at the base station.

2. The method of claim 1, wherein said implementing comprises:

iteratively selecting an unanswered call and disconnecting that call until either all of the unanswered calls are disconnected or the total transmission power falls below the first power threshold; and if the downlink voice path of all of the unanswered calls is muted, iteratively selecting an unanswered call and disconnecting that call until either all of the unanswered calls are disconnected or the total transmission power falls below the first power threshold.

3. The method of claim 2, wherein said implementing further comprises, if all of the unanswered calls are disconnected, iteratively selecting an answered call and either disconnecting or decreasing a packet data rate of that answered call, until the total transmission power falls below the first power threshold.

4. The method of claim 1, further comprising:

determining a connection power as the total transmission power excluding a power used by ringing tone payloads associated with the unanswered calls; and when the connection power exceeds a second power threshold, rejecting new calls in the cell until the connection power no longer exceeds the second power threshold.

5. The method of claim 1, wherein the total transmission power comprises a total carrier power.

6. The method of claim 1, wherein muting the downlink voice path of a call comprises using discontinuous transmission (DTX) to mute that downlink voice path.

7. The method of claim 1, wherein muting the downlink voice path of a call comprises dropping speech frames associated with that call.

8. The method of claim 1, wherein muting the downlink voice path of a call comprises applying a lower scheduling priority to that call.

9. The method of claim 1, wherein the total transmission power is measured as channel utilization.

10. The method of claim 1, further comprising:
   determining whether frames or packets associated with each call contain ringing tones; and
   identifying certain ones of the calls as unanswered calls based on the determination.

11. The method of claim 1, wherein said implementing comprises:
   determining whether any of the unanswered calls are not in discontinuous transmission (DTX) mode;
   selecting one or more of the determined unanswered calls that are not in discontinuous transmission (DTX) mode; and
   muting the selected one or more of the determined unanswered calls.

12. The method of claim 11, wherein said selecting is performed periodically.

13. The method of claim 11, wherein said selecting is performed in a round robin fashion.

14. The method of claim 1, further comprising:
   measuring power used by the unanswered calls in the cell that are not in DTX mode;
   estimating power used by ringing tone payloads associated with the unanswered calls based on the measured power used by the unanswered calls;
   determining a connection power based on the measured total transmission power and the estimated power used by the ringing tone payloads;
   comparing the connection power to a second power threshold; and
   accepting or rejecting new calls in the cell based on the comparison of the connection power to the second power threshold.

15. A wireless station in a network, the wireless station comprising:
   a power detector configured to measure a total transmission power associated with calls in a cell associated with the wireless station, wherein the calls include answered and unanswered calls that originated in the cell; and
   a control circuit configured to:
      if the total transmission power exceeds a first power threshold, implement congestion control measures at the wireless station to reduce the total transmission power below the first power threshold, wherein implementing a congestion control measure on a call includes at least one of muting a downlink voice path of that call, decreasing a data rate of that call, and disconnecting that call, wherein implementing said congestion control measures comprises prioritizing the unanswered calls lower than the answered calls with respect to said congestion control measures, said implementing comprising at least one of:
         iteratively selecting an unanswered call and disconnecting that call until either all of the unanswered calls are disconnected or the total transmission power falls below the first power threshold; and
         iteratively selecting an unanswered call whose downlink voice path is not muted and muting that downlink voice path, until either the downlink voice paths of all of the unanswered calls are muted or the total transmission power falls below the first power threshold; and
      if the total transmission power does not exceed the first power threshold, refrain from implementing said congestion control measures at the base station.

16. The wireless station of claim 15, wherein the control circuit is configured to implement the congestion control measures by:
   iteratively selecting an unanswered call and disconnecting that call until either all of the unanswered calls are disconnected or the total transmission power falls below the first power threshold; and
   if the downlink voice path of all of the unanswered calls is muted, iteratively selecting an unanswered call and disconnecting that call until either all of the unanswered calls are disconnected or the total transmission power falls below the first power threshold.

17. The wireless station of claim 16, wherein the control circuit is configured to implement the congestion control measures by, if all of the unanswered calls are disconnected, iteratively selecting an answered call and either disconnecting or decreasing a packet data rate of that answered call, until the total transmission power falls below the first power threshold.

18. The wireless station of claim 15, wherein the control circuit is further configured to:
   determine a connection power as the total transmission power excluding a power used by ringing tone payloads associated with the unanswered calls; and
   when the connection power exceeds a second power threshold, reject new calls in the cell until the connection power no longer exceeds the second power threshold.

19. The wireless station of claim 15, wherein, when muting the downlink voice path of a call, the control circuit is configured to use discontinuous transmission (DTX) to mute that downlink voice path.

20. The wireless station of claim 15, wherein, when muting the downlink voice path of a call, the control circuit is configured to drop speech frames associated with that call.

21. The wireless station of claim 15, wherein, when muting the downlink voice path of a call, the control circuit is configured to apply a lower scheduling priority to the at least one unanswered call.

22. The wireless station of claim 15, further comprising:
   a call tracking circuit configured to:
      determine whether frames or packets associated with each call contain ringing tones, and
      identify certain ones of the calls as unanswered calls based on the determination.

23. The wireless station of claim 15, wherein the power detector is further configured to measure power used by the unanswered calls in the cell that are not in DTX mode, and wherein the control circuit is further configured to:
   estimate power used by ringing tone payloads associated with the unanswered calls based on the measured power used by the unanswered calls,
   determine a connection based on the measured total transmission power and the estimated power used by the ringing tone payloads,
   compare the connection power to a second power threshold, and
   accept or reject said new calls based on the comparison of the connection power to the second power threshold.

24. A method implemented at a base station in a wireless network, the method comprising:
   measuring a total transmission power associated with calls in a cell of the wireless network, wherein the calls include answered and unanswered calls that originated in the cell;
   determining a connection power as the total transmission power excluding a power used by ringing tone payloads associated with the unanswered calls in the cell that are not in discontinuous transmission (DTX) mode;

when the connection power exceeds a power threshold, rejecting new calls in the cell until the connection power no longer exceeds the power threshold; and when the connection power does not exceed the power threshold, refraining from rejecting new calls in the cell.

25. A system comprising:

a power detector configured to measure total transmission power associated with calls in a cell of a wireless network, wherein the calls include answered and unanswered calls that originated in the cell;

a power estimator configured to determine whether frames or packets associated with the calls contain ringing tones, by inspecting those frames or packets;

an answered call tracking circuit configured to identify certain ones of the calls as answered calls if the frames or packets associated with those calls do not contain ringing tones;

an unanswered call tracking circuit configured to identify certain ones of the calls as unanswered calls if the frames or packets associated with those calls do contain ringing tones; and a call/packet stream control circuit configured to, when the total transmission power does not exceed a power threshold, refrain from muting selected ones of the identified unanswered calls' downlink voice paths, and, when the total transmission power exceeds the power threshold, mute selected ones of the identified unanswered calls' downlink voice paths by one or more of:

using discontinuous transmission to mute the selected ones of the identified unanswered calls' downlink voice paths, dropping speech frames associated with the selected ones of the identified unanswered calls, and applying a lower scheduling priority to the selected ones of the identified unanswered calls.

* * * * *

UNITED STATES PATENT AND TRADEMARK OFFICE
CERTIFICATE OF CORRECTION

PATENT NO. : 8,649,284 B2  
APPLICATION NO. : 13/001746  
DATED : February 11, 2014  
INVENTOR(S) : Lennartson et al.

Page 1 of 1

It is certified that error appears in the above-identified patent and that said Letters Patent is hereby corrected as shown below:

On the Title Page, in Item (75), under "Inventors", in Column 1, Line 1, delete "Hagersten (SE);" and insert -- Hägersten (SE); --, therefor.

On the Title Page, in Item (52), under "U.S. Cl.", in Column 1, Line 2, delete "455/428;" and insert -- 455/423; --, therefor.

In the Specification:

In Column 6, Line 64, delete "channel The" and insert -- channel. The --, therefor.

Signed and Sealed this
Fifteenth Day of July, 2014

Michelle K. Lee
*Deputy Director of the United States Patent and Trademark Office*